United States Patent
Delos Reyes et al.

(10) Patent No.: US 8,838,725 B2
(45) Date of Patent: Sep. 16, 2014

(54) INTERNET CACHE SUBSCRIPTION FOR WIRELESS MOBILE USERS

(75) Inventors: Emerando Delos Reyes, Pleasant Hill, CA (US); Benjamin J. Parker, Vacaville, CA (US); Samir Ait-Ameur, Fremont, CA (US); Lin Sun, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 194 days.

(21) Appl. No.: 13/191,953

(22) Filed: Jul. 27, 2011

(65) Prior Publication Data
US 2013/0031197 A1 Jan. 31, 2013

(51) Int. Cl.
*G06F 15/16* (2006.01)
*G06F 17/30* (2006.01)

(52) U.S. Cl.
CPC .............................. *G06F 17/30902* (2013.01)
USPC ........................... 709/213; 709/217; 370/328

(58) Field of Classification Search
None
See application file for complete search history.

(56) References Cited

U.S. PATENT DOCUMENTS

| | | | |
|---|---|---|---|
| 7,114,008 B2 * | 9/2006 | Jungck et al. | 709/246 |
| 7,707,182 B1 * | 4/2010 | Kee et al. | 707/638 |
| 7,831,772 B2 * | 11/2010 | Nalawade et al. | 711/119 |
| 2003/0149618 A1 * | 8/2003 | Sender et al. | 705/14 |
| 2005/0216569 A1 * | 9/2005 | Coppola et al. | 709/213 |
| 2007/0156845 A1 * | 7/2007 | Devanneaux et al. | 709/217 |
| 2008/0139112 A1 * | 6/2008 | Sampath et al. | 455/3.04 |
| 2012/0209942 A1 * | 8/2012 | Zehavi et al. | 709/213 |
| 2012/0243471 A1 * | 9/2012 | Boulos et al. | 370/328 |

OTHER PUBLICATIONS

Hofmann, Markus; Leland R. Beaumont (Mar. 1, 2005). Content Networking: Architecture, Protocols, and Practice. Morgan Kaufmann Publisher. ISBN 1-55860-834-6 The relevant chapter of Hofmann and Leland book has been included for reference with the instant office action.*

* cited by examiner

*Primary Examiner* — Jung Kim
*Assistant Examiner* — Janusz Kusyk

(57) ABSTRACT

A server device may receive an indication that a mobile device has enrolled in a cache subscription service. The server device may receive cache parameters associated with the cache subscription service, where the cache parameters are specific to the mobile device. Content may be retrieved from a network and stored, in a memory associated with the one or more server devices, based on the received cache parameters. The server device may receive, from the mobile device, a request for particular content, determine whether the request for particular content corresponds to content that is stored in the memory, and provide, when determining that the requested particular content corresponds to content that is stored in the memory, the corresponding stored content to the mobile device.

19 Claims, 7 Drawing Sheets

US 8,838,725 B2

INTERNET CACHE SUBSCRIPTION FOR WIRELESS MOBILE USERS

BACKGROUND

As smart phones, tablets, and net-books flood the market, these wireless mobile devices are becoming the preferred medium for accessing information and content from the Internet. Subscribers accustomed to wired broadband connections are expecting the same Internet experience when they switch to their wireless mobile devices. To address these expectations, wireless network providers are trying to fine tune their network to optimize delivery of Internet reach media contents over their infrastructure.

One popular solution is caching Internet content by Content Delivery Networks (CDNs). A CDN may include one or more caching servers that store Internet content based on defined rules. The defined rules may be based on, for example, popularity of content, importance of content, or quantity of hits on content. Once content is stored by the CDN, subsequent requests for the stored content may be served from the CDN, thereby expediting delivery of the content.

One shortcoming of such an implementation is that content, which may not be popular or important, may never be stored by a CDN. Thus, Internet content, which may be preferred by a particular user, may not be cached by the CDN if the content does not fall within the rules by which the CDN caches content.

DETAILED DESCRIPTION OF PREFERRED EMBODIMENTS

The following detailed description refers to the accompanying drawings. The same reference numbers in different drawings may identify the same or similar elements. The following detailed description does not limit the invention.

Systems and/or methods described herein may allow users of mobile devices to subscribe to a caching service. A caching server (or set of servers) may determine content that is desirable to users, either through direct instructions from users, or determined based on users' content-accessing patterns. The caching server may retrieve the content from a network (e.g., the Internet), and store the retrieved content. This retrieving and storing may be performed periodically, on an interval that is manually input by users, and/or automatically determined based on users' content-accessing patterns. The caching server may receive a request for content from a mobile device. The caching server may determine whether the requested content corresponds to content that is stored by the caching server (and/or by one or more storage devices that are associated with the caching server). If the requested content corresponds to content that is stored by the caching server, then the caching server may provide the stored content to the requesting mobile device. In this manner, cached content, that was previously retrieved from a network (e.g., the Internet), may be provided to a user much more quickly than if the content were retrieved from the network upon the user's request.

Figure 1:
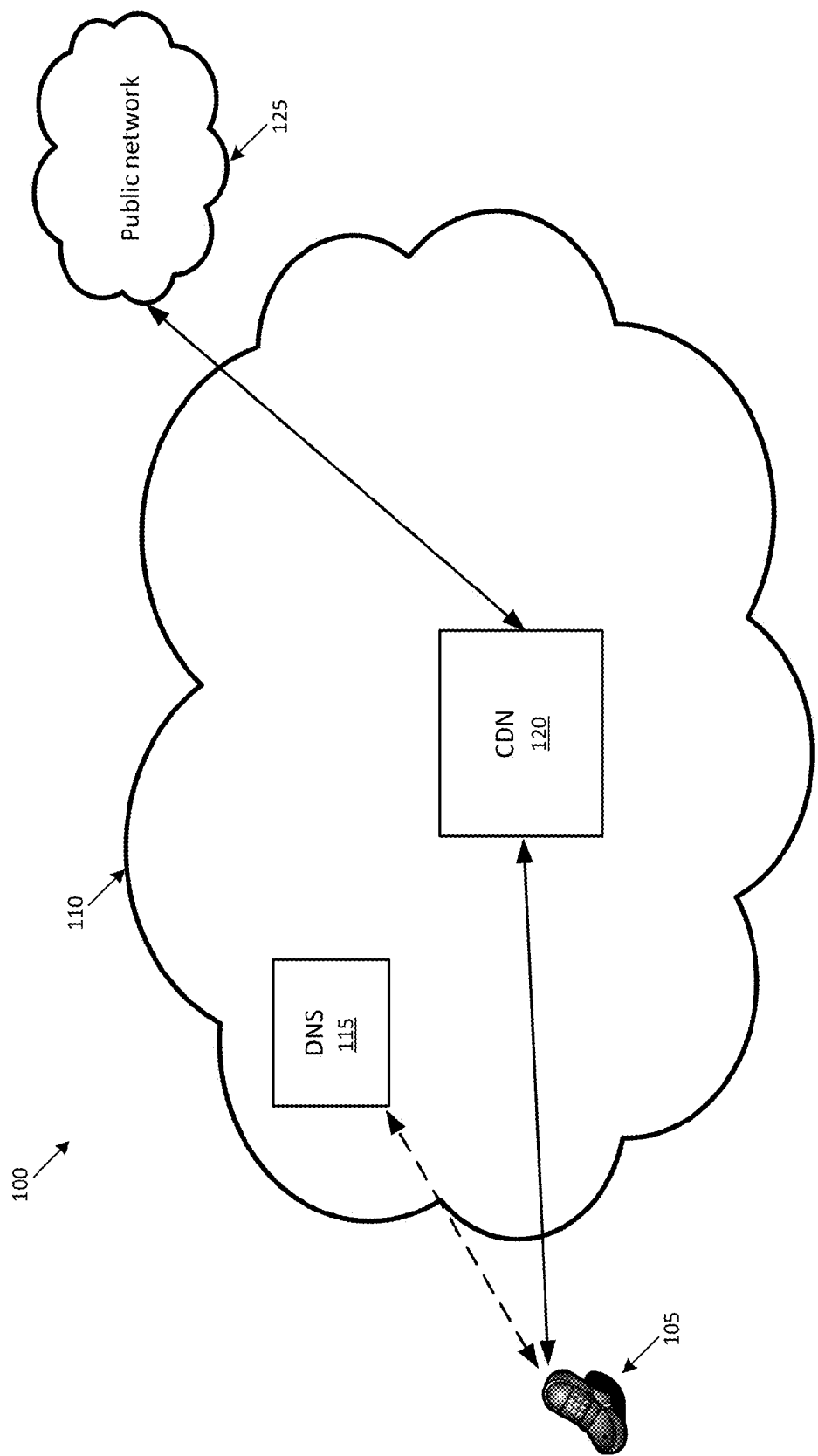
FIG. 1 is a diagram of example components of a system that includes a CDN that enables cached delivery of content to mobile device users.

FIG. 1 is a diagram of example components of a system 100. The system 100 may include a mobile device 105 that connects to a wireless network 110. The wireless network 110 may include a Domain Name System (DNS) server 115 and a CDN 120. Components of the wireless network 110 (e.g., CDN 120) may communicate with other networks, such as a public network 125. In another implementation, the system 100 may include additional, fewer, different, or differently arranged components The mobile device 105 may include any device that is capable of accessing the wireless network 110, such as a cellular telephone, a laptop computer, a personal digital assistant (PDA), a desktop computer, a tablet computer, a video game player, a media player, etc. The mobile device 105 may access the wireless network 110 using one or more cellular telecommunication standards (e.g., Code Division Multiple Access (CDMA), Time Division Multiple Access (TDMA), Global System for Mobile Communications (GSM), IEEE 802.11, etc.).

The wireless network 110 may include one or more devices that work with the mobile device 105 to provide various functionality to the mobile device 105. For example, the wireless network 110 may include a set of one or more devices (not pictured) that allow the mobile device 105 to make and/or receive telephone calls, send and/or receive short message service (SMS) messages, send and/or receive multimedia messaging service (MMS) messages, send and/or receive e-mails, etc. The wireless network 110 may be owned, operated, and/or maintained by a single entity (e.g., a wireless telephone service provider), or by a group of entities.

The wireless network 110 may also include one or more devices that work with the mobile device 105 to provide Internet connectivity to the mobile device 105. Such devices may include the DNS server 115 and the CDN 120. The DNS server 115 may include one or more server devices that receive a request for Internet content (e.g., a web page) from the mobile device 105. The request may include a location identifier for the content, such as a uniform resource locator (URL). The DNS server 115 may direct the request for content to the CDN 120. For example, the DNS server 115 may return an IP address of the CDN 120 to the mobile device 105 in order to allow the mobile device 105 to directly communicate with the CDN 120.

The CDN 120 may include one or more server devices that retrieve content from the public network 125, and cache the retrieved content for later use by users of the wireless network 110 (e.g., the mobile device 105). The CDN 120 may retrieve content by identifying popular Internet content (and/or receiving a list of popular Internet content), and retrieving the most popular Internet content. The CDN 120 may identify and retrieve the content based on configurable parameters. For example, the CDN 120 may receive, or determine, a list of Internet content that has received a highest number of hits over a certain period of time. The CDN 120 may receive, or determine, a list of Internet content to retrieve based on user patterns (e.g., browsing and/or search patterns of users of the wireless network 110, search patterns retrieved from Internet search engines, etc.). When retrieving content, the CDN 120 may access a web page via, e.g., a URL, and may retrieve (or "download") content located at the URL. The CDN 120 may also download other content associated with the URL (e.g., content that is accessible within a particular number of links of the URL). When retrieving the content, the CDN 120 may store the retrieved content, as well as an identifier that identifies from where the content was retrieved (e.g., the URL at which the retrieved content was located).

The CDN 120 may retrieve content on a periodic schedule (e.g., once every day, once every hour, once every twenty minutes, etc.). The parameters by which the CDN 120 retrieves content from the Internet (e.g., which content the CDN 120 retrieves, how much content the CDN 120 retrieves, how often the CDN 120 retrieves content, etc.) may be configurable by an owner and/or operator of the wireless network 110.

When the CDN 120 receives a request for content, the CDN 120 may check whether the CDN 120 currently stores the requested content (e.g., whether the CDN 120 has previously retrieved the requested content). The CDN 120 may compare a URL included in the request to URLs associated with the content stored by the CDN 120. If the CDN 120 determines that the requested content is not stored by the CDN 120, then the CDN 120 may retrieve the requested content from the public network 125, and provide the requested content to the mobile device 105.

If the CDN 120 determines that the requested content is stored by the CDN 120, the CDN 120 may perform a check to make sure that the stored content is current. To perform the check, the CDN 120 may, for example, attempt to access a web page located at the URL, and make a determination of whether the content stored by the CDN 120 is the same as the web page that is located at the URL. The CDN 120 may, for example, compare a timestamp of the accessed web page to a timestamp of the stored content. If the timestamps are the same, then the CDN 120 may determine that the stored content is current, and the CDN 120 may provide the stored content to the mobile device 105. If the timestamps are not the same, then the CDN 120 may re-retrieve the content stored at the URL, and then provide the newly retrieved content to the mobile device 105. The CDN 120 may also store the newly retrieved content, thus overwriting the old content.

The public network 125 may include any type of publicly accessible network, such as the Internet, an intranet, a Wide Area Network (WAN), etc. In some implementations, public network 125 may be replaced by, or may include, one or more private networks (e.g., one or more home, office, or enterprise Local Area Networks (LANs)).

Figure 2:
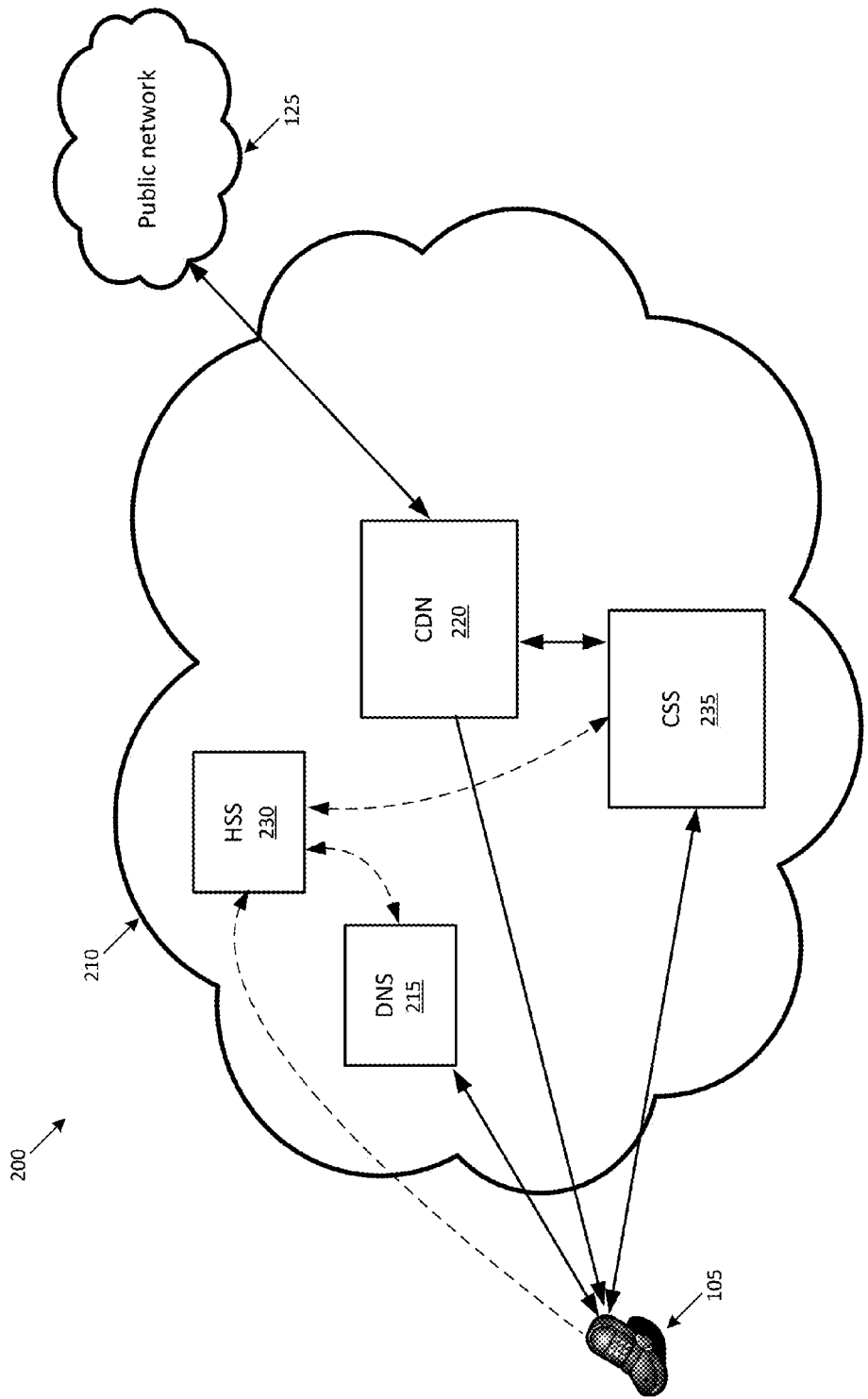
FIG. 2 is a diagram of example components of a system that includes a Cache Subscription Server that enables enhanced cached delivery of content to mobile device users.

FIG. 2 is a diagram of example components of a system according to an implementation described herein. The system 200 may include a mobile device 105 that connects to a wireless network 210. The wireless network 210 may include a DNS server 215, a CDN 220, a home subscriber server (HSS) 230, and a Cache Subscription server (CSS) 235. Components of the wireless network 210 (e.g., CDN 120) may communicate with other networks, such as the public network 125. In another implementation, the system 200 may include additional, fewer, different, or differently arranged components.

The network 210 may include one or more devices that work with the mobile device 105 to provide various functionality to the mobile device 105. For example, the network 210 may include a set of one or more devices (not pictured) that allow the mobile device 105 to make and/or receive telephone calls, send and/or receive SMS messages, send and/or receive MMS messages, send and/or receive e-mails, etc. The network 210 may be owned, operated, and/or maintained by a single entity (e.g., a wireless telephone service provider), or by a group of entities.

The network 210 may also include one or more devices that work with the mobile device 105 to provide Internet connectivity to the mobile device 105. Such devices may include the DNS server 215, the CDN 220, the HSS 230, and the CSS 235. The HSS 230 may include one or more server devices that maintain subscriber profiles of users of the network 210, perform authentication of devices associated with the network 210 (e.g., mobile device 105), and perform other tasks. The HSS 230 may receive an indication that the mobile device 105 is allowed to use the CSS 235 (e.g., a user of the mobile device has enrolled in a CSS subscription). Upon receiving the indication that the mobile device 105 is allowed to use the CSS 235, the HSS 230 may notify the DNS server 215 that the mobile device 105 is enabled to make use of the CSS 235.

The DNS server 215 may receive a request for content (e.g., a web page located on the Internet) from the mobile device 105. The request may include a location identifier for the content, such as a uniform resource locator (URL) or a uniform resource identifier (URI). The DNS server 215 may determine whether the mobile device 105 is allowed to use the CSS 235. For example, the DNS server 215 may check whether the HSS 230 has previously notified the DNS server 215 that the mobile device 105 is allowed to use the CSS 235. Alternative, or additionally, the DNS server 215 may query the HSS 230 upon receiving the request for content.

If the DNS server 215 determines that the mobile device 105 is allowed to use the CSS 235, then the DNS server 115 may return an IP address of the CSS 235 to the mobile device 105 in order to allow the mobile device 105 to directly communicate with the CSS 235. If the mobile device is not allowed to use the CSS 235, then the DNS server 115 may direct the request for content to the CDN 220. For example, in such a scenario, the DNS server 115 may return an IP address of the CDN 220 to the mobile device 105 in order to allow the mobile device 105 to directly communicate with the CDN 220.

The CDN 220 may include one or more server devices that perform functions similar to those described above with respect to the CDN 120. For example, the CDN 220 may retrieve and cache popular content (e.g., content from the public network 125) based on configurable parameters. The CDN 220 may provide the cached content upon receiving a request for cached content.

The CSS 235 may include one or more server devices that retrieve and cache additional content, that is desired by users. The content that is retrieved and cached by the CSS 235 may be content that the CDN 220 may not retrieve and cache. The CSS 235 may receive an enrollment request for enrollment of the mobile device 105. The enrollment request may indicate whether a user of the mobile device 105 wishes to enroll in a manual or a dynamic subscription. If the user wishes to enroll in a manual subscription, the enrollment request may include parameters, which are similar to parameters discussed above with respect to the CDN 120. For example, the parameters may include a list of one or more URLs to cache, an update frequency, etc.

If the user wishes to enroll in a dynamic subscription, the mobile device 105 may be provided with a dynamic cache parameter application that runs on the mobile device 105. The CSS 235 may provide the dynamic cache parameter application to the mobile device 105 in response to the dynamic subscription enrollment request, or the CSS 235 may signal some other device to provide the dynamic cache parameter application to the mobile device 105. Alternatively, the dynamic cache parameter application may already be present on the mobile device 105. The cache parameter application may collect data regarding the user's activity (with the user's consent), and may generate a set of parameters based on the user's activity.

These parameters may identify content (e.g., a set of URLs) that the user has frequently visited, and/or content that a user is likely to visit (e.g., a set of URLs that have content that is related to content associated with URLs that the user has visited). The parameters may be based on any methodology that is designed to predict which content the user has accessed, or may desire to access in the future. In lieu of, or in addition to, generating the parameters, the dynamic cache parameter application may send raw data (e.g., data that indicates the user's activity) that is collected by the dynamic cache parameter application to an external device. The external device may generate the parameters, and communicate the parameters to the CSS 235. The CSS 235 may also receive the raw data and generate the parameters itself.

A user may also manually alter parameters at any time. For example, a user enrolled in a dynamic subscription may view the parameters generated on behalf of the user, and alter the parameters (e.g., add URLs, modify URLs, delete URLs, change frequency of update, etc.).

The enrollment request may also include an indication of whether content should be "pushed" to the mobile device 105 when the content is retrieved by the CSS 235 (i.e., whether the CSS 235 should provide the content to the mobile device 105 without receiving a specific request for the content), or the like. The indication may be based on capabilities of the mobile device 105 (e.g., data speed, storage space, etc.), bandwidth allotments associated with the mobile device 105 (e.g., whether the mobile device 105 is associated with a data plan that has sufficient bandwidth for pushing content, etc.). The indication may also identify certain content that is to be pushed to the device, while other, non-identified content, may not be pushed to the mobile device 105 (i.e., such content may be retrieved and cached by the CSS 235, but not provided to the mobile device 105 until the mobile device 105 requests the content). The indication may also be generated in response to a specific selection by the user. The indication of whether to push cached data to the mobile device 105 may be received from the mobile device 105, or may be generated by the CSS 235 (or some other device) based on the capabilities of the mobile device 105.

The CSS 235 may use these parameters (e.g., parameters received from a mobile device 105 during manual subscription enrollment, parameters generated on behalf of a mobile device 105 that is enrolled in a dynamic subscription, etc.) to retrieve content from the public network 125, and cache the retrieved content for later use by users of the network 210 who are enrolled in a CSS subscription (e.g., the mobile device 105).

When retrieving content, the CSS 235 may access a web page via, e.g., a URL, and may retrieve (or "download") content (e.g., text, pictures, videos, etc.) located at the URL. The CSS 235 may also download other content associated with the URL (e.g., content that is accessible within a particular number of links of the URL). When retrieving the content, the CSS 235 may store the content itself, as well as an identifier that identifies where the content was retrieved from (e.g., the URL). The CSS 235 may retrieve content on a periodic schedule (e.g., once every day, once every hour, once every twenty minutes, etc.), that is based on the parameters received by the CSS 235.

When the CSS 235 receives a request for content, the CSS 235 may check whether the CSS 235 currently stores the requested content (e.g., whether the CSS 235 has previously retrieved the requested content). The CSS 235 may compare a URL included in the request to URLs associated with the content stored by the CSS 235. If the CSS 235 determines that the requested content is stored by the CSS 235, the CSS 235 may perform a check to make sure that the stored content is current. To perform the check, the CSS 235 may attempt to access a web page located at the URL, and make a determination of whether the content stored by the CSS 235 is the same as the web page that is located at the URL. The CSS 235 may, for example, compare a timestamp of the accessed web page to a timestamp of the stored content. If the timestamps are the same, then the CSS 235 may determine that the stored content is current, and the CSS 235 may provide the stored content to the mobile device 105. If the timestamps are not the same, then the CSS 235 may re-retrieve the content stored at the URL, and then provide the newly retrieved content to the mobile device 105. The CSS 235 may also store the newly retrieved content, thus overwriting the old content. If the CSS 235 determines that the requested content is not stored by the CSS 235, then the CSS 235 may forward the request to the CDN 220. The CDN 220 may handle this request as described above.

By caching Internet content (e.g., by using a CSS 235 and/or a CDN 220), a service provider can provide cached Internet content to users more quickly than if the content was not cached. Caching the content on the service provider's own device(s) allows the service provider to provide lower latency and higher bandwidth responses to requests for content than if the requests for content had to propagate through the Internet. For example, instead of relying on a content provider's device (s) (e.g., a server that stores a desired web page), which may serve hundreds or thousands of content requests at any given moment, a service provider may serve the content from a CSS 235 and/or the CDN 220. The service provider's own device (s) may have significantly less demand than content providers' device(s) may have, thus improving the performance of content requests that can be served by the CSS 235 and/or the CDN 220. Additionally, a service provider may upgrade and maintain the specific device(s) associated with the CSS 235 and/or CDN 220, thereby allowing the service provider to ensure that faster and/or more reliable devices may be used that relying on content providers' devices.

As is apparent from the discussion above, the CSS 235 may act to augment the caching functionality of systems which already include a CDN 220. In such systems, the functionality of the CDN 220 may be augmented without performing any modification to the existing CDN 220. Since a CSS 235 retrieves and caches content based on user preferences that are directly based on its subscribers, the CSS 235 is more likely than a CDN 220 to include content that is directly relevant to CSS subscribers. Thus, a CSS 235 may serve to enhance the caching functionality of a system that includes a CDN 220.

While FIG. 2 was described as including specific components, functionality of components may be implemented in other components than was described above. Additionally, not all of the components described are necessary for all embodiments. For example, the system 200 may include a CSS 235, but not a CDN 220. In such a scenario, if the CSS 235 does not include requested content, the CSS 235 may retrieve the content from the public network 125, and provide the content to the mobile device 105, instead of forwarding the request to a CDN.

Figure 3:
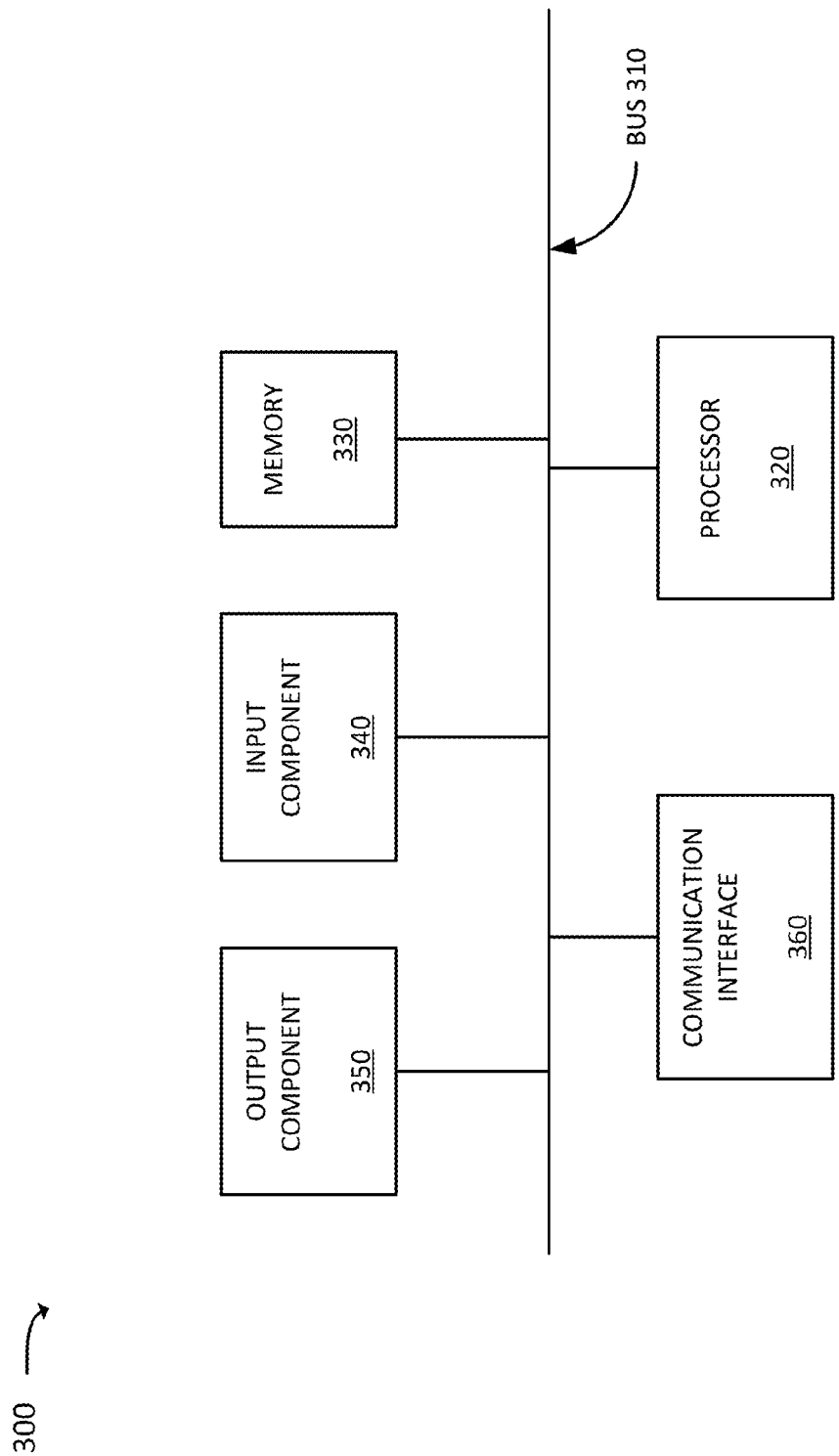
FIG. 3 is a diagram of example components of a device of FIGS. 1 and/or 2.

FIG. 3 is a diagram of example components of a device 300. Each of the devices illustrated in FIG. 1 or 2 may include one or more devices 300. The device 300 may include a bus 310, a processor 320, a memory 330, an input component 340, an output component 350, and a communication interface 360. In another implementation, the device 300 may include additional, fewer, different, or differently arranged components. Some non-limiting examples of the device 300, with additional and/or different components, are discussed below.

The bus 310 may include one or more communication paths that permit communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

The input component 340 may include a mechanism that permits an operator to input information to device 300, such as a keyboard, a keypad, a button, a switch, etc. Output component 350 may include a mechanism that outputs information to the operator, such as a display, a speaker, one or more light emitting diodes (LEDs), etc.

The communication interface 360 may include any transceiver-like mechanism that enables device 300 to communicate with other devices and/or systems. For example, communication interface 360 may include an Ethernet interface, an optical interface, a coaxial interface, or the like. The communication interface 360 may include a wireless communication device, such as an infrared (IR) receiver, a Bluetooth radio, or the like. The wireless communication device may be coupled to an external device, such as a remote control, a wireless keyboard, a mobile telephone, etc. In some embodiments, the device 300 may include more than one communication interface 360. For instance, the device 300 may include an optical interface and an Ethernet interface.

As will be described in detail below, the device 300 may perform certain operations relating to caching content (e.g., Internet content) based on parameters tailored to CSS subscribers. The device 300 may perform these operations in response to the processor 320 executing software instructions contained in a computer-readable medium, such as the memory 330. A computer-readable medium may be defined as a non-transitory memory device. A memory device may include space within a single physical memory device or spread across multiple physical memory devices. The software instructions may be read into the memory 330 from another computer-readable medium or from another device. The software instructions contained in the memory 330 may cause the processor 320 to perform processes described herein. Alternatively, hardwired circuitry may be used in place of or in combination with software instructions to implement processes described herein. Thus, implementations described herein are not limited to any specific combination of hardware circuitry and software.

The software instructions may be read into the memory 330 from another computer-readable medium or from another device. The software instructions included in the memory 330 may cause to the processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
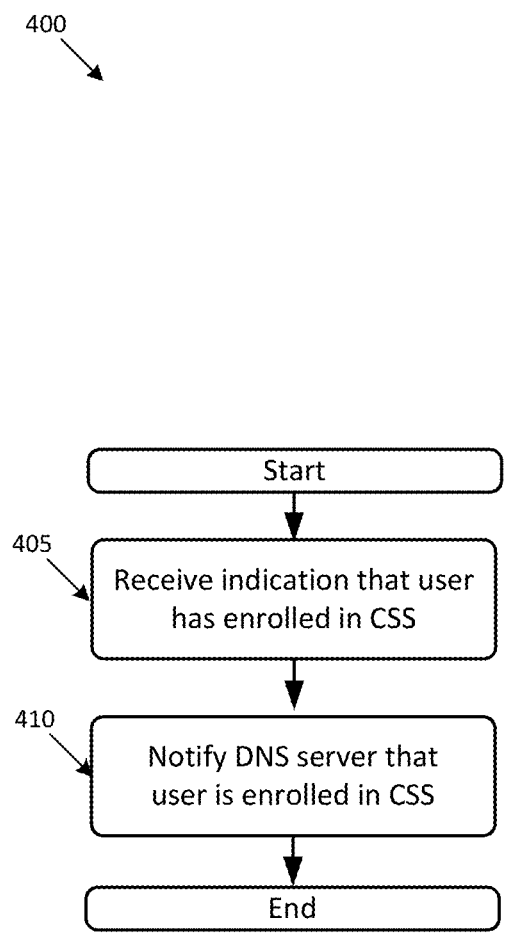
FIG. 4 is a diagram of an example flowchart of a process for enrolling a user in a CSS subscription.

FIG. 4 is a flowchart of an example process 400 that may be performed by an HSS (e.g., the HSS 230) upon enrollment of a device (e.g., the mobile device 105) into a CSS subscription. The process 400 may include receiving an indication that a mobile device 105 has enrolled in a CSS subscription (block 405). For example, once the mobile device 105 enrolls in a CSS subscription, a CSS 235, or another device, may notify the HSS 230 that the mobile device 105 has enrolled in a CSS subscription. The DNS server 215 may be notified that the mobile device 105 has enrolled in a CSS subscription (block 410). The HSS 230 may also receive an indication that the mobile device 105 has un-enrolled from the CSS subscription, and may notify the DNS server 215 accordingly.

Figure 5:
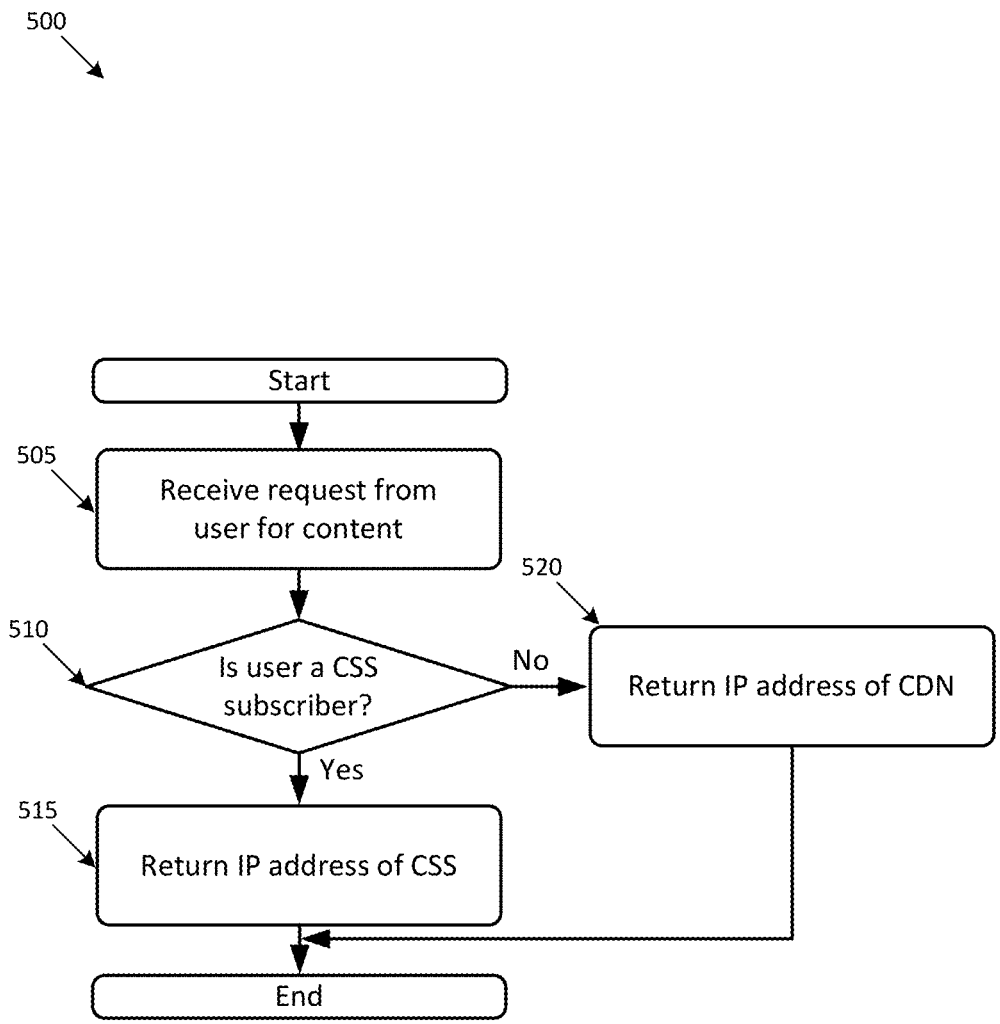
FIG. 5 is a diagram of an example flowchart of a process that may be performed by a Domain Name System (DNS) server when handling requests for content.

FIG. 5 is a flowchart of an example process 500 for handling a request for content. The process 500 may be performed by a DNS server, such as the DNS server 215. In other implementations, the process 500 may be performed by another device, or a set of devices. The process 500 may include receiving a request from a mobile device (e.g., the mobile device 105) for content (e.g., Internet content) (block 505).

A determination may be made as to whether the mobile device 105 is allowed to use the CSS 235 (e.g., whether a user associated with the mobile device 105 has enrolled in a CSS subscription) (block 510). When making the determination, the DNS server 215 may determine whether an indication has been previously received (e.g., from the HSS 230), that identifies that the mobile device 105 is allowed to use the CSS 235. When making the determination, the DNS server 215 may also, or alternatively, query another device (e.g., the HSS 230) to determine whether the mobile device 105 is allowed to use the CSS 235.

If the mobile device 105 is allowed to use the CSS 235, then the IP address of the CSS 235 may be returned to the mobile device 105 (block 515). If, on the other hand, the mobile device 105 is not allowed to use the CSS 235, then the IP address of the CDN 220 may be returned to the mobile device 105 (block 520). In an implementation where the network 210 does not include a CDN 220, a traditional domain name resolving may be performed when the mobile device 105 is not allowed to use the CSS 235. For example, in such a scenario, a DNS lookup may be performed in order to enable the mobile device 105 to retrieve the requested content from the public network 125.

Figure 6A:
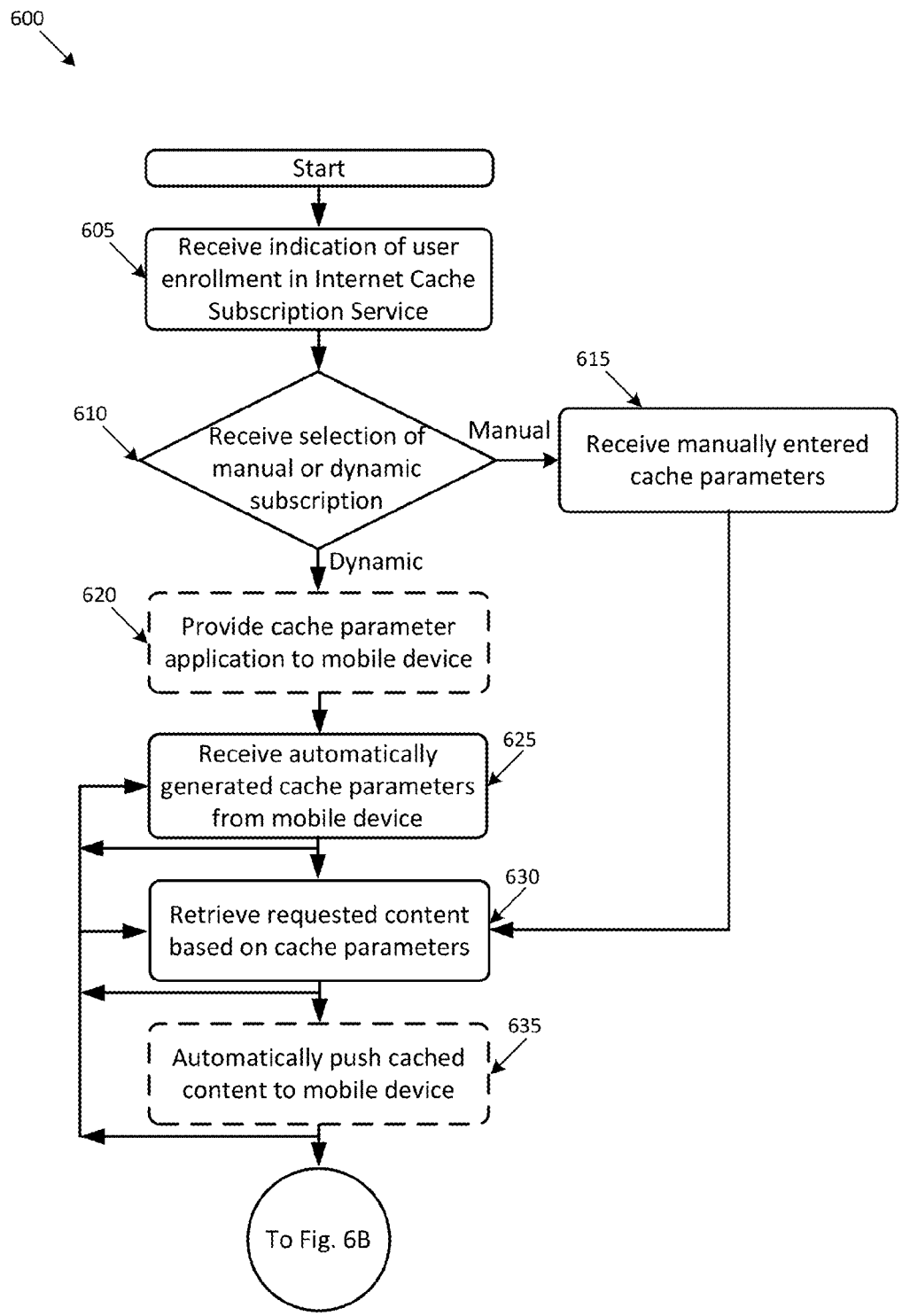
FIGS. 6A-B illustrate an example flowchart of a process for providing content by a system that includes a CSS.
Figure 6B:
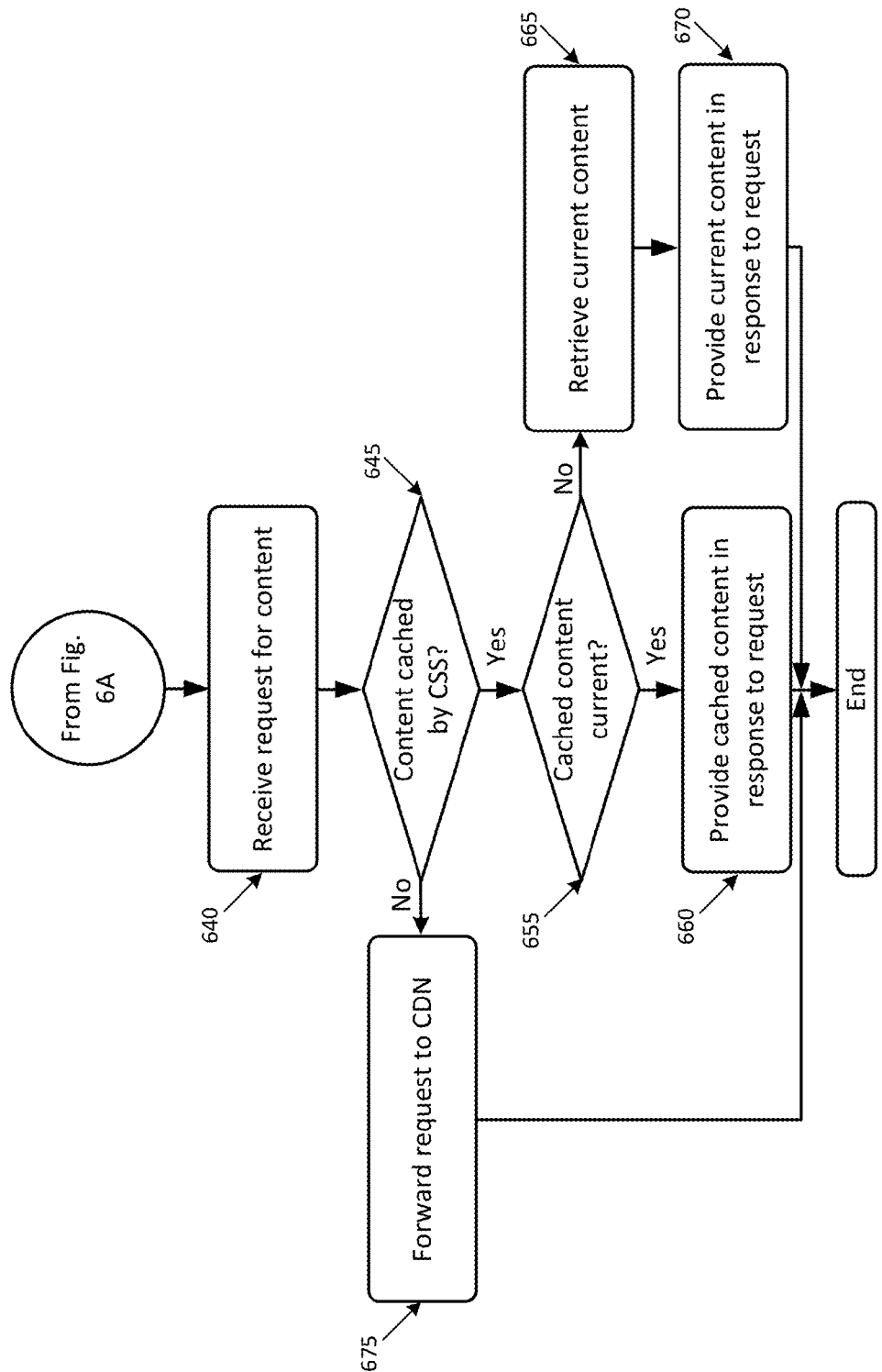

FIGS. 6A-B illustrate a flowchart of an example process 600 in accordance with some embodiments of a CSS subscription. The process 600 may be performed by a CSS, such as the CSS 235. In other implementations, the process 600 may be performed by another device, or a set of devices. The process 600 may include receiving an indication of an enrollment of a user (e.g., a user associated with the mobile device 105) in a CSS subscription (block 605). The indication may be received from the mobile device 105, or from another device, such as a personal computer. The indication may be provided via a web page that presents various options, associated with the CSS subscription. Examples of such options are presented below. The web page may be provided by the CSS 235, or by one or more other devices.

The user may be required, before or concurrently with enrolling in the CSS subscription, to agree to a billing option associated with the CSS subscription. For example, the user may be required to enter billing information (e.g., credit card information). The user may be required to select service options associated with the CSS subscription (e.g., amount of bandwidth allotted for the CSS subscription, how long the CSS subscription lasts, whether the CSS subscription is automatically renewed, etc.). These options may be presented on the web page that presents the various options associated with the CSS subscription, or these options may be collected at an earlier time, and stored in a memory device that is accessible by the CSS 235.

The user may also have an option of enrolling in a sponsored CSS subscription, in which case, cached content is presented from the CSS 235, along with advertisements that are displayed on the user's mobile device 205. The CSS 235 may embed the advertisements into retrieved content (for example, when providing a cached web page to a user, the CSS 235 may add one or more advertisements in the form of image and/or text data to the web page).

The user may further have an option of enrolling in a hybrid paid/sponsored subscription, in which case, the user is presented with fewer, or visually smaller, advertisements than a sponsored CSS subscription, but pays less than the user would if the user had selected a paid subscription. For example, if a sponsored CSS subscription provides the user with three additionally added advertisement images in cached content, a hybrid/paid subscription may provide the user with one additionally added advertisement image in cached content. Additionally, or alternatively, the hybrid/paid subscription may provide the user with text advertisement(s) in lieu of image advertisements that would have been provided via a sponsored CSS subscription. Furthermore, while an advertisement image may be of a certain size (e.g., 80×60 pixels) in a sponsored CSS subscription, the same advertisement image may be of a reduced size (e.g., 40×30 pixels) in a hybrid paid/sponsored subscription.

A determination may be made of whether the CSS subscription is a manual subscription or a dynamic subscription (block 610). This determination may be made based on the indication that is received at block 605. In other words, the indication (received at block 605) may include information that identifies whether the desired CSS subscription is a manual subscription or an dynamic subscription.

If the CSS subscription is a manual subscription, then manually entered parameters may be received (block 615). The parameters may identify content that the user has identified as content that the user wishes to access. For example, the parameters may identify a URL of a web page (or multiple URLs of multiple web pages). The parameters may also identify a depth of links that the user wishes to cache as well. For example, a user may identify "www.wsj.com" as a URL that the user wishes to cache. The user may also indicate that the user wants to cache content that is one link removed from the web page located at www.wsj.com. Thus, the user desires to cache the web page located at www.wsj.com, and web pages that are pointed to by links that appear on the web page located at www.wsj.com. If, for example, the user specifies that the user wants to cache content that is two links removed from the web page located at www.wsj.com, then web pages, pointed to by links that appear on web pages that are pointed to by links on the web page located at www.wsj.com, would be cached.

The parameters may also specify how often the desired content is to be cached. For example, the parameters may specify that the user wants the content located at www.wsj.com to be cached every morning at 8:00 AM. The parameters may specify any other interval, such as once a week, once every three hours, once every twenty minutes, etc. The parameters may also specify different intervals for different content. For example, the parameters may specify that the content located at www.wsj.com (and content that is located within one link of www.wsj.com) be cached once a day, while the parameters may specify that the content located at www.nationalenquirer.com (and content that is located within two links of www.nationalenquirer.com) be updated every two hours.

If, on the other hand, the CSS subscription is a dynamic subscription, then the mobile device 105 may be provided with a cache parameter application that automatically generates parameters (block 620). The CSS 235 may provide the cache parameter application to the mobile device 105 in response to the dynamic subscription enrollment request, or the CSS 235 may signal some other device to provide the cache parameter application to the mobile device 105. Alternatively, the cache parameter application may already be present on the mobile device 105. In such a scenario, the CSS 235 may send a signal to the mobile device 105 instructing the mobile device 105 to activate the cache parameter application. As described above, the cache parameter application may collect data regarding the user's activity (with the user's consent), and may generate a set of parameters based on the user's activity.

For example, the cache parameter application may analyze the user's activity to identify that the user visits the site www.wsj.com every morning between 8:00 AM and 9:00 AM. The cache parameter application may also identify that the user frequently selections (e.g., "clicks") on links that are on the web page located at www.wsj.com (e.g., the number of selections of links, on the web page located at www.wsj.com, may be greater than a predetermined threshold, and/or the percentage of links, on the web page located at www.wsj.com, that are selected, may be greater than a predetermined threshold, etc.). The cache parameter application may further identify how long the user spent at each page. The cache parameter application may also identify that the user visits the site www.nationalenquirer.com every two hours. The cache parameter application may automatically generate parameters based on the observed user activity, and send the generated parameters to the CSS 235.

The generated parameters may be received from the cache parameter application running on the mobile device 105 (block 625). As described above, the generated parameters may specifically identify which content is to be cached (e.g., URL(s) for desired content, how many links removed from URL(s) to be cached, etc.), as well has how often to cache the desired content. Alternatively, or in addition to receiving the cache parameters from the cache parameter application, raw statistics may be received from the cache parameter application. For example, cache parameter application may provide the CSS 235 with information, such as an identification of content accessed by the user, how long the user spent accessing the content, how often the user accessed the content, etc. The CSS 235 may use these raw statistics to generate cache parameters on its own. The CSS 235 may also provide the raw statistics to another device, or a set of devices, and receive cache parameters in return.

Content may be retrieved based on the received (and/or generated) cache parameters (block 630). The content may be retrieved and cached by the CSS 235 from the public network 125. For example, if the cache parameters indicate that the web page located at www.wsj.com is to be retrieved, the CSS 235 may retrieve that web page. If the particular mobile device 105 is identified as a mobile device 105 to which cached content should be pushed, some or all of the cached content may be pushed to the mobile device 105 without a specific request from the mobile device (block 635).

As illustrated in FIG. 6A, any of blocks 625, 630, and/or 635 may repeat as necessary. For example, CSS 235 may receive cache parameters from multiple mobile devices in an ongoing process (block 625). The CSS 235 may repeatedly retrieve requested content based on cache parameters (e.g., each time new parameters are received, based on a periodic schedule specified by cache parameters, etc.) (block 630). Additionally, content may repeatedly be pushed to mobile devices (e.g., mobile device 105) when content, intended for the mobile devices, is retrieved (block 635).

As illustrated in FIG. 6B, a request for content may be received (block 640). For example, the CSS 235 may receive a request from the DNS server 215, indicating that the mobile device 105 has requested the web page located at www.wsj.com. A determination may be made of whether the requested content is stored by the CSS 235 (block 645). For example, the CSS 235 may determine whether the CSS 235 has cached the web page located at www.wsj.com. If the requested content is cached by the CSS 235, then a determination may be made as to whether the cached content is current (e.g., if the content that is currently located at the requested URL is the same as the cached content) (block 655). This determination may ignore advertisements that are associated with the content (e.g., advertisements that are on the web page at the requested URL). When making the determination, the CSS 235 may, for example, compare a timestamp of the cached content to a timestamp of the content located on the public network 125. The CSS 235 may also use any other type of analysis to determine whether the cached content corresponds to current content.

If the cached content is current, then the cached content may be provided to the requesting mobile device 105 (block 660). For example, if the mobile device 105 requested the page located at www.wsj.com, and the CSS 235 determined that the requested web page was cached and current, then the CSS 235 may provide the requested web page to the mobile device 105.

If the cached content is determined (at block 655) to not be current, then current content may be retrieved (block 665). For example, the CSS 235 may have determined that the CSS 235 has cached an old version of the web page located at www.wsj.com, and that new content is available on the web page. The CSS 235 may retrieve the new web page, and overwrite the old version of the web page. The newly retrieved and cached content may then be provided to the requesting mobile device 105 (block 670).

If the content is determined not to be cached by the CSS 235 (at block 645), then the request for content may be forwarded to a CDN (e.g., the CDN 220) (block 675). The CDN may then serve the request in a manner similar to that described above with respect to CDNs 120 and 220. For example, the CDN 220 may determine whether the CDN 220 has cached the requested content. If the CDN 220 has cached the requested content, then the CDN 220 may provide the requested content to the requesting mobile device 105. If the CDN 220 has not cached the requested content, then the CDN 220 may retrieve the requested content from the public network 125, and provide the retrieved content to the requesting mobile device 105.

When providing content to the mobile device 105 (e.g., at blocks 660 and/or 670), advertisements may be provided in conjunction with the provided content. The advertisements may be displayed at the mobile device 105 when the provided content is displayed by the mobile device 105. Whether an advertisement is provided and/or displayed may depend on what type of subscription with which the mobile device 105 is associated.

For example, if the mobile device 105 is associated with a paid subscription, the quantity advertisements provided and/or displayed may be zero. Alternatively, a certain quantity of advertisements may be provided, but fewer than would be provided in a hybrid paid/sponsored subscription, or a sponsored subscription.

If the mobile device 105 is associated with a hybrid paid/sponsored subscription, then the quantity of advertisements provided and/or displayed may be zero, or a non-zero number that is greater than would be provided with a paid subscription, but fewer than would be provided with a sponsored subscription.

If the mobile device 105 is associated with a sponsored subscription, then the quantity of advertisements provided and/or displayed may be zero, or a non-zero quantity that is greater than would be provided with a paid subscription or a hybrid paid/sponsored subscription.

The device(s) and processes described above allow a user to experience enhanced performance when accessing content in which the user has expressed a desire to access. By caching content (e.g., Internet web pages) according to a user's specific instructions and/or content accessing habits, a CSS can ensure that the CSS has cached the desired content, thus facilitating faster delivery of the content to the user. Owners of networks that include a CSS (e.g., service providers) may monetize the CSS service by selling advertisements, and/or by selling subscriptions to the CSS service.

The foregoing description of implementations provides illustration and description, but is not intended to be exhaustive or to limit the possible implementations to the precise form disclosed. Modifications and variations are possible in light of the above teachings or may be acquired from practice of the implementations. For example, while series of blocks have been described with regard to FIGS. 4-6B, the order of the blocks may be modified in other implementations. Further, non-dependent blocks may be performed in parallel.

It will be apparent that embodiments, as described above, may be implemented in many different forms of software, firmware, and hardware in the implementations illustrated in the figures. The actual software code or specialized control hardware used to implement embodiments is not limiting of the embodiments. Thus, the operation and behavior of the embodiments have been described without reference to the specific software code, it being understood that software and control hardware may be designed based on the description herein.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a server device, an indication that a mobile device has enrolled in a cache subscription service;
   notifying, by the server device, a home subscriber server (HSS) that the mobile device has enrolled in the cache subscription service,
   where the HSS notifies a Domain Name System (DNS) server that the mobile device has enrolled in the cache subscription service,
   where the DNS server provides a first location identifier, associated with the server device, to the mobile device, in response to a request for content from the mobile device, when the mobile device has enrolled in the cache subscription service,
where the DNS server provides a second location identifier, associated with a content delivery network (CDN) server, to another mobile device, in response to a request for content from the other mobile device, where the other mobile device has not enrolled in the cache subscription service;
receiving, by the server device, cache parameters associated with the cache subscription service, where the cache parameters are specific to the mobile device and are automatically generated based on user activity, with respect to accessing content, at the mobile device;
retrieving, by the server device, and storing, in a memory associated with the server device, content, available on a network, based on the received cache parameters; and
pushing, by the server device and to the mobile device, at least some of the stored content that is retrieved based on the received cache parameters.

2. The method of claim 1, further comprising:
receiving, by the server device and from the mobile device, a request for particular content;
determining that the request for particular content corresponds to content that is stored in the memory; and
providing, by the server device and when determining that the requested particular content corresponds to content that is stored in the memory, the corresponding stored content to the mobile device.

3. The method of claim 2, where determining whether the request for particular content corresponds to content stored in the memory includes:
determining whether content stored in the memory is current content; and
identifying that the request for particular content corresponds to content stored in the memory when the content stored in the memory is current.

4. The method of claim 3, where determining whether content stored in the memory is current content includes:
comparing a timestamp of stored content with a timestamp of content that is located on the network; and
determining that the stored content is current when the timestamp of the stored content matches the timestamp of the content that is located on the network.

5. The method of claim 3, where determining whether content stored in the memory is current content includes:
comparing a timestamp of stored content with a timestamp of content that is located on the network; and
determining that the stored content is not current when the timestamp of the stored content does not match the timestamp of the content that is located on the network.

6. The method of claim 5, further comprising:
retrieving current content, that corresponds to the requested content, when determining that the stored content is not current; and
providing the retrieved current content to the mobile device.

7. The method of claim 2, where the request for the particular content includes a location identifier that includes a location, in the network, at which the requested particular content is stored.

8. The method of claim 7, where the location identifier includes at least one of a Uniform Resource Locator (URL) or a Uniform Resource Identifier (URI).

9. The method of claim 2, further comprising:
providing the request for the particular content to the CDN server when the requested particular content is not stored in the memory.

10. The method of claim 2, wherein the particular content is different from content that has been pushed to the user device.

11. The method of claim 1, where the cache parameters identify one or more locations, in the network, that correspond to content that is to be cached.

12. The method of claim 1, where the cache parameters identify an interval at which to retrieve and store content.

13. A method, comprising:
receiving, by a first server device, an indication that a user device is associated with a cache subscription service;
notifying, by the first server device, a second server device that the user device is associated with the cache subscription service,
where the second server device provides a first location identifier, associated with the first server device, to the mobile device, in response to a request for content from the mobile device,
where the second server device provides a second location identifier, associated with a Content Delivery Network (CDN) server, to another mobile device, in response to a request for content from the other mobile device, where the other mobile device is not associated with the cache subscription service;
providing, by the first server device and to the user device, a plurality of options for the caching subscription service, the options including one or more of:
an identification of one or more web pages to cache on behalf of the user device,
a depth of links, from the one or more web pages, at which to cache web pages pointed to by the links,
a cache interval at which to cache content of the one or more web pages, or
a type of subscription, where different types of subscriptions correspond to different levels of advertisements being presented at the user device in conjunction with content presented at the user device;
receiving, by the first server device, information associated with the one or more options, where the information is automatically generated based on user activity, with respect to accessing content, at the user device;
caching, by the first server device, content of the one or more web pages according to the received information; and
pushing, by the first server device and to the user device, the content of the one or more web pages.

14. The method of claim 13, where the identification of one or more web pages includes one or more location identifiers that identify where the one or more web pages are located on a network.

15. The method of claim 13, where the information associated with the one or more options indicates that a subscription, in which advertisements are to be provided when providing cached content, has been selected,
where pushing the content of the one or more web pages further comprising includes:
embedding, in the one or more web pages, one or more advertisements that are not initially included as part of the one or more web pages.

16. A system, comprising:
one or more server devices to:
receive an indication that a mobile device has enrolled in a dynamic cache subscription service;
provide a first location identifier, associated with the server device, to the mobile device, in response to a request for content from the mobile device, the providing being based on the indication that the mobile device has enrolled in the dynamic cache subscription service;

provide a second location identifier, associated with a content delivery network (CDN) server, to another mobile device, in response to a request for content from the other mobile device;

receive cache parameters associated with the dynamic cache subscription service, where the cache parameters are specific to the mobile device and are automatically generated based on user activity, with respect to accessing content, at the mobile device;

retrieve and store, in a memory associated with the one or more server devices, content, available on a network, based on the received cache parameters; and push stored content that is retrieved based on the received cache parameters.

17. The system of claim 16, where the one or more server devices are further to:

receive, from the mobile device, a request for particular content;

determine whether the request for particular content corresponds to content that is stored in the memory, where when determining whether the request for Internet content corresponds to content stored in the memory, the one or more server devices are to:

determine whether content stored in the memory is current content; and identify that the request for Internet content corresponds to content stored in the memory when the content stored in the memory is current; and provide, when determining that the requested particular content corresponds to content that is stored in the memory, the corresponding stored content to the mobile device.

18. The system of claim 16, where the cache parameters are first cache parameters, where the one or more service devices are further to:

receive an indication that the mobile device has enrolled in a manual cache subscription service, receive second cache parameters associated with the manual cache subscription service, the second cache parameters being manually entered at the mobile device.

19. The system of claim 16, where the one or more server devices are further to:

receive, from the mobile device, a request for particular content;

determine whether the request for particular content corresponds to content that is stored in the memory; and forward, when determining that the requested particular content does not correspond to content that is stored in the memory, the request for the particular content to one or more servers of the CDN.

* * * * *